Figure 1:
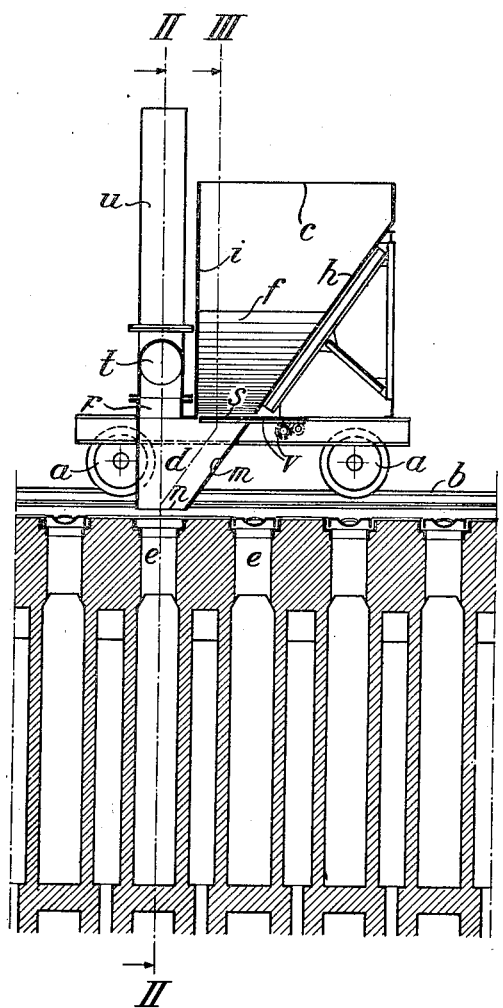

Jan. 16, 1934.   C. STILL   1,943,635
COAL CHARGING TRUCK
Filed Aug. 5, 1930   2 Sheets-Sheet 1

Inventor:
Carl Still
by
J. C. Hutchinson Jr.
Attorney

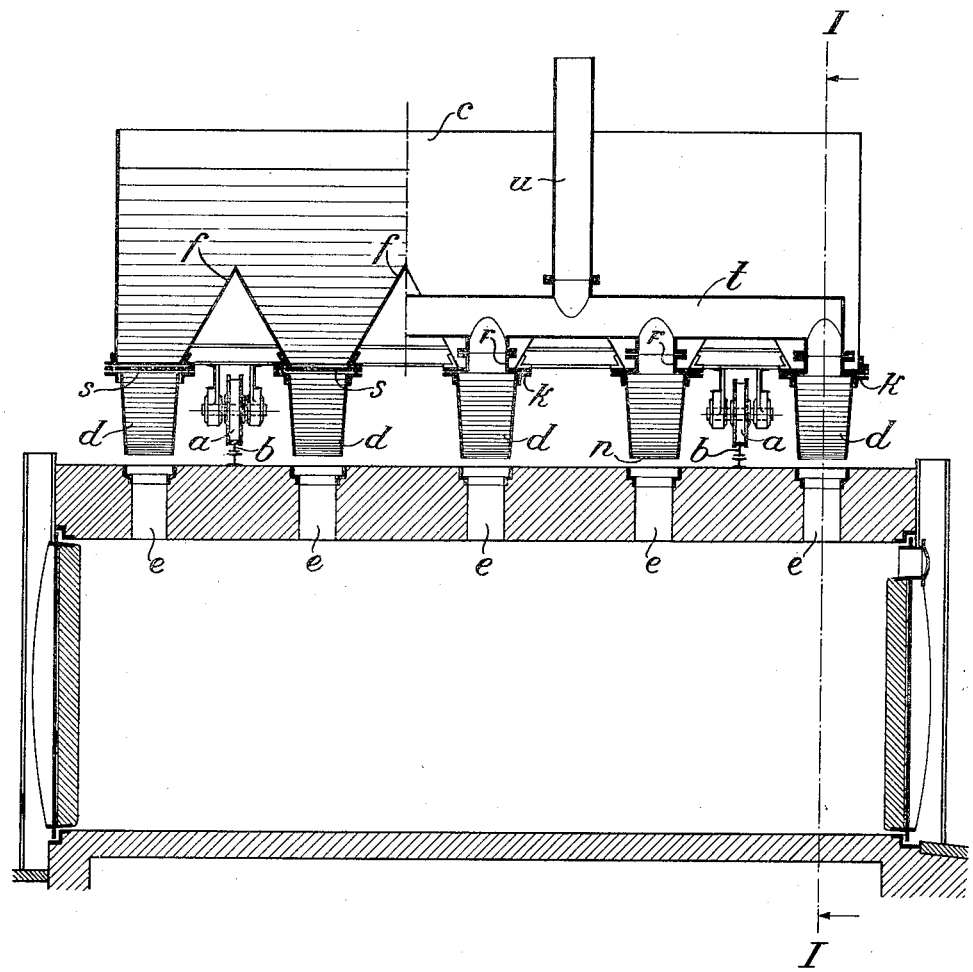

Patented Jan. 16, 1934

1,943,635

UNITED STATES PATENT OFFICE 1,943,635

COAL CHARGING TRUCK

Carl Still, Recklinghausen, Germany

Application August 5, 1930, Serial No. 473,276, and in Germany August 9, 1929

6 Claims. (Cl. 214—18)

My invention relates to a travelling truck for charging with coal chamber ovens of any type or retorts for the manufacture of coke and gas from the top, which truck is so constructed that the charging operation is improved and damage to the coal container and inconvenience to workmen, due to gases and flame which escape from the charging holes in the roof of the ovens during charging, are avoided as far as possible.

An embodiment of a charging truck constructed in accordance with the invention and applied in use to a horizontal coke oven is illustrated in the accompanying drawings, in which Fig. 1 is a vertical cross section on the line I—I of Fig. 2, whereas Fig. 2 is a longitudinal vertical section, the right half being taken on the line II—II and the left half on the broken line III—II of Fig. 1.

The truck comprises a container $c$ for the coal to be charged into the oven, supported on wheels $a$ and travelling along a track $b$ on the roof of the battery of ovens. The container carries a number of charging ducts $d$ corresponding with the number of charging holes in the roof of an oven (in this case, five) and so arranged that by suitable movement of the truck along the track $b$, their outlets $n$ can be caused to register with the charging holes $e$ in the roof of the oven. Each duct $d$ is in communication at its upper end with the container $c$ by way of an opening in the latter which can be closed by means of a horizontal slide valve $s$ which is operated by the rack and pinion gear $v$. The pinions of the several slides $s$ are fitted on a common shaft $x$.

Between each pair of openings there is provided inside the container $c$ a pair of oppositely inclined surfaces $f$, arranged in the manner of a gable, as shown in the left hand half of Fig. 2. Thus, the container $c$ is, in fact, divided into five charging hoppers corresponding to the charging holes $e$. The rear defining wall $h$ of the container $c$ (see Fig. 1) is also inclined to form a chute, whilst the opposite front wall $i$ has a vertical or nearly vertical position. Thus, when the slide valves $s$ are open, the coal in the container $c$ is guided into the charging ducts $d$ by the inclined surfaces $f$ and $h$. The charging ducts $d$ are detachably mounted on the lower part of the container $c$, for instance by means of angle irons $k$, and have each an inclined rear wall $m$ forming a continuation of the inclined rear wall $h$ of the container $c$. The bottom outlet $n$ of each duct $d$ lies in close proximity to, but clear of, the upper surface of the furnace roof.

As it is shown by Fig. 1, the inclination of the rear walls $m$ of the charging ducts $d$ result in the outlets $n$ of the ducts and the charging holes $e$ registering therewith being offset with respect to the container $c$; this is one of the features of the invention. In combination with this arrangement the upper portions of the ducts $d$ project beyond the container $c$ and form extensions of their inside spaces, namely, at the side of the perpendicular wall $i$. It will be likewise seen from Figure 1 that in operation the slide valves $s$ open away from the vertical side wall $i$. The roofs of the projections of the ducts $d$ bear gas offtakes $r$ communicating with a common horizontal pipe $t$, which in turn communicates with a vertical pipe $u$ serving as a chimney to create the necessary draught in the pipe system. The chimney pipe $u$ is so positioned that it does not obstruct the movement of the truck into position beneath the main coal bunker for filling.

The operation of the apparatus is as follows:—

The container $c$ is filled with coal, the slides $s$ being closed, and moved along the track $b$ until the outlets $n$ of the charging ducts $d$ register with the charging holes $e$ of the oven which is to be charged. The slides $s$ are thereupon partially opened and then gradually further opened to the maximum extent. The fact that, by the arrangement described, the slides $s$ begin to open the bottom outlets of the container $c$ at the side of its vertical defining wall $i$ results in the coal in the container $c$ being discharged without the risk of any stoppage. The coal slides over the inclined rear walls $m$ of the charging ducts $d$ through the outlets $n$ and the charging holes $e$ into the oven. Besides, the gradual operating of the slide valves $s$ ensures that the coal running downwards will only partially fill the ducts $d$ or the outlets $n$. Consequently, the gases and flame which escape from the charging holes $e$ can freely enter and pass the ducts $d$, and escape by way of the offtakes $r$ and the pipe $t$ into the pipe $u$ from which they are discharged into the atmosphere without causing inconvenience to workmen, who are thus not prevented from carrying out cleaning or other regular manipulations on the roof of the furnace in the neighbourhood of the charging holes during the charging operation.

The small clearance between the outlets $n$ and the charging holes $e$ in no way gives rise to damage or inconvenience owing to the draught caused by the vertical chimney pipe $u$. Since the coal container $c$ is offset with respect to the outlets $n$ and the offtakes $r$, it does not come into direct contact with the gases and flame which escape from the oven during charging, and is thus saved from damage.

When the charging ducts $d$ become damaged or worn owing to the exposure to the injurious action of the gases and flame, they may be removed by disconnecting the angle irons $k$ and replaced by fresh ducts at a very slight expense.

After the oven has been charged, the truck is withdrawn from the oven without difficulty, since the outlets $n$ of the ducts $d$ are clear of the upper ends of the charging holes $e$ of the oven.

A truck constructed in the manner herein described thus permits the charging of an oven and the taking off of noxious gases in a simple operating manner which obviates trouble, danger and damage.

What I claim is:—

1. In a coal charging truck, a coal container having two plane opposite defining walls converging downwards, the one wall being substantially vertical and the other being inclined throughout their lengths, a closing slide at the bottom of the inclined wall which moves perpendicularly to and away from the vertical wall in opening and a second substantially vertical wall laterally displaced from the first vertical wall and projecting below the slide to form a portion of a charging duct.

2. In a coal charging truck, a coal container having two plane opposite defining walls converging downwards, the one wall being substantially vertical and the other being inclined throughout their lengths, a closing slide at the bottom of the inclined wall which moves perpendicularly to and away from the vertical wall in opening, a charging duct positioned beneath the slide forming a substantially closed continuation thereof and having a substantially vertical wall offset from the first vertical wall, and a gas offtake leading upwardly from the second vertical wall.

3. In a coal charging truck, a coal container having two plane opposite defining walls converging downwards, the one wall being substantially vertical and the other being inclined throughout their lengths, a closing slide at the bottom of the inclined wall which moves perpendicularly to and away from the vertical wall in opening, and a charging duct positioned beneath the slide forming a substantially closed continuation thereof, and having its discharge orifice offset from the vertical wall of the container.

4. In a coal charging truck, a coal container having two plane opposite defining walls converging downwards, the one wall being substantially vertical and the other being inclined throughout their lengths, a closing slide at the bottom of the inclined wall which moves perpendicularly to and away from the vertical wall, a charging duct positioned beneath the slide and having a rear inclined wall forming a substantially closed continuation of the inclined container wall and a vertical wall offset from the first vertical wall, and a gas offtake on the duct with the walls thereof aligned and parallel with the vertical wall of the duct.

5. In a coal charging truck, a coal container having two plane opposite defining walls converging downwards, the one wall being substantially vertical and the other being inclined throughout their lengths, a closing slide at the bottom of the inclined wall which moves perpendicularly to and away from the vertical wall, a charging duct forming a substantially closed continuation of the container which is positioned beneath the slide and projects laterally from the vertical container wall, and a gas offtake fitted on the projecting part of said duct.

6. In a coal charging truck, a coal container having two plane opposite defining walls conveying downwards, the one wall being substantially vertical and the other being inclined throughout their entire lengths, a horizontally movable closing slide at the bottom of the inclined wall adapted to move perpendicularly to and away from the vertical wall and arrested in its forward movement thereby, a charging duct forming a substantially closed continuation of said container positioned beneath said slide, and projecting laterally from the vertical wall of said container, and a gas offtake fitted on the projecting part of said duct adapted to lead away gases produced during charging.

CARL STILL.